United States Patent
Nam et al.

(10) Patent No.: US 10,296,728 B2
(45) Date of Patent: May 21, 2019

(54) METHOD AND SYSTEM FOR PROVIDING CLOUD-BASED APPLICATION SECURITY SERVICE

(71) Applicant: INKA ENTWORKS, INC., Seoul (KR)

(72) Inventors: Jae Min Nam, Seoul (KR); Jin Seon Hong, Seoul (KR)

(73) Assignee: INKA ENTWORKS, INC., Seoul (KR)

( * ) Notice: Subject to any disclaimer, the term of this patent is extended or adjusted under 35 U.S.C. 154(b) by 208 days.

(21) Appl. No.: 15/503,473

(22) PCT Filed: Aug. 13, 2015

(86) PCT No.: PCT/KR2015/008512
§ 371 (c)(1),
(2) Date: Feb. 13, 2017

(87) PCT Pub. No.: WO2016/024838
PCT Pub. Date: Feb. 18, 2016

(65) Prior Publication Data
US 2017/0242986 A1     Aug. 24, 2017

(30) Foreign Application Priority Data

Aug. 13, 2014 (KR) .......................... 10-2014-0105445

(51) Int. Cl.
*G06F 21/12* (2013.01)
*H04L 9/06* (2006.01)
(Continued)

(52) U.S. Cl.
CPC ............ *G06F 21/125* (2013.01); *G06F 21/00* (2013.01); *G06F 21/52* (2013.01); *H04L 9/0643* (2013.01);
(Continued)

(58) Field of Classification Search
CPC ........ G06F 21/125; G06F 21/00; G06F 21/52; G06F 2221/0724; H04L 9/0643; H04L 9/3239; H04L 2209/16; H04L 2209/60
See application file for complete search history.

(56) References Cited

U.S. PATENT DOCUMENTS

| 8,695,060 B2 | 4/2014 | Wade et al. |
| 8,850,010 B1 * | 9/2014 | Qureshi ............. H04L 41/0816 709/225 |

(Continued)

FOREIGN PATENT DOCUMENTS

| KR | 10-2014-0075785 | 6/2014 |
| KR | 10-2014-0077539 | 6/2014 |

(Continued)

OTHER PUBLICATIONS

International Search Report for PCT/KR2015/008512 dated Nov. 25, 2016, 4 pages.

(Continued)

*Primary Examiner* — Yonas A Bayou
(74) *Attorney, Agent, or Firm* — Nixon & Vanderhye P.C.

(57) ABSTRACT

The present invention relates to a method and a system for providing a cloud-based application security service. The system for providing the cloud-based application security service according to the present invention includes: a client device including a compiler, an execution package composition unit, an uploader, and a downloader; and a cloud device including an execution package decomposition unit, a security library providing unit, a security library application unit, and an execution package recomposition unit, thereby, based on a cloud, providing convenience in security application and rapid action against hacker attacks.

9 Claims, 7 Drawing Sheets

(51) Int. Cl.
*G06F 21/00* (2013.01)
*G06F 21/52* (2013.01)
*H04L 9/32* (2006.01)

(52) U.S. Cl.
CPC .... *H04L 9/3239* (2013.01); *G06F 2221/0724* (2013.01); *H04L 2209/16* (2013.01); *H04L 2209/60* (2013.01)

(56) References Cited

U.S. PATENT DOCUMENTS

| | | | | |
|---|---|---|---|---|
| 8,966,646 | B2* | 2/2015 | Wilson | G06F 21/125 |
| | | | | 711/164 |
| 9,135,418 | B2* | 9/2015 | Wade | G06F 21/54 |
| 9,158,902 | B2* | 10/2015 | Maor | G06F 21/00 |
| 9,165,139 | B2* | 10/2015 | Wade | G06F 21/54 |
| 9,396,325 | B2* | 7/2016 | Kendall | H04L 9/0863 |
| 9,473,485 | B2* | 10/2016 | Kendall | H04L 63/0815 |
| 2010/0095069 | A1* | 4/2010 | Asher | G06F 9/44 |
| | | | | 711/132 |
| 2013/0091543 | A1* | 4/2013 | Wade | G06F 21/54 |
| | | | | 726/1 |
| 2014/0215225 | A1 | 7/2014 | Koliesnik | |
| 2014/0223426 | A1 | 8/2014 | Thales | |
| 2014/0223545 | A1 | 8/2014 | Frerebeau et al. | |
| 2016/0191545 | A1* | 6/2016 | Nanda | H04L 43/062 |
| | | | | 726/1 |

FOREIGN PATENT DOCUMENTS

| | | |
|---|---|---|
| KR | 10-2014-0090279 | 7/2014 |
| KR | 10-2014-0097927 | 8/2014 |

OTHER PUBLICATIONS

Written Opinion of the ISA for PCT/KR2015/008512 dated Nov. 25, 2016, 5 pages.

* cited by examiner

US 10,296,728 B2

METHOD AND SYSTEM FOR PROVIDING CLOUD-BASED APPLICATION SECURITY SERVICE

This application is the U.S. national phase of International Application No. PCT/KR2015/008512 filed 13 Aug. 2015 which designated the U.S. and claims priority to KR Patent Application No. 10-2014-0105445 filed 13 Aug. 2014, the entire contents of each of which are hereby incorporated by reference.

BACKGROUND OF THE INVENTION

1. Field of the Invention

The present invention relates to a method and a system for providing a cloud-based application security service.

2. Description of the Related Art

It should be noted that details to be mentioned below merely provide background information related to the present embodiment but do not constitute the prior art.

Recently, cases have frequently occurred in which an unauthorized user: invades others' computers to steal information; manipulates a binary code of a computer program using reserve engineering to cause the computer program to perform a different function from originally intended; or manipulates a binary code using a tool, such as a debugger, to misuse the binary code while a computer program is running. For example, if those who intend to manipulate a client program which operates on a PC of an online game user, reverse-engineer and manipulate the program to be automatically performed, then a game item may be obtained in an improper manner.

Thus, it is needed to protect a binary code corresponding to a source code of an application. Currently, a binary code of an application is generally protected by applying a security solution Software Development Kit (SDK) to the source code. When the SDK is used to protect the binary code of the application, it is necessary first to be well-informed of the usage of the SDK and then to add libraries of the SDK to the existing source code. Further, since the existing source code may be changed, a considerable time and developers' effort are required. Further, the foregoing method cannot take rapid action against attacks on the binary code by hackers.

SUMMARY OF THE INVENTION

In order to solve the above-mentioned problems, the present invention is to provide a method and a system for providing a cloud-based application security service that makes it possible to, based on a cloud, provide convenience in security applications and to take rapid action against hacker attacks.

In accordance with an aspect of the present invention, a method for providing a cloud-based application security service in a security service providing system including a client device and a cloud device according to an exemplary embodiment of the present invention includes: a binary generation process in which the client device generates a binary by compiling an application source; an execution package composition process in which the client device composes an execution package comprising the binary generated in the binary generation process; an uploading process in which the client device uploads the execution package composed in the execution package composition process into the cloud device; an execution package decomposition process in which the cloud device extracts a binary by decomposing the execution package uploaded in the uploading process; a security library application recomposition process in which the cloud device generates a security-applied binary by applying one of a plurality of security libraries to the binary extracted in the execution package decomposition process; an execution package recomposition process in which the cloud device recomposes a security-applied execution package comprising the security-applied binary generated in the security library application process; and a downloading process in which the client device downloads the security-applied execution package recomposed in the package recomposition process.

The security library may include a hash verification function for integrity verification, and the method may further include a hash code generation process in which the cloud device generates a hash code with respect to the binary extracted in the execution package decomposition process for the hash verification function in the security library.

The security library may include an anti-debugging function, an anti-dump function, or an anti-debugging function and dump function in addition to the hash verification function.

The method may further include a security tag setting process in which the client device sets a security tag for a specific function of the application source before the binary generation process.

The method may further include a debugging library connection process in which the client device automatically connects a relevant debugging library to the security tag when the security tag set in the security tag setting process is detected.

The execution package decomposition process may include extracting the debugging library by parsing the execution package uploaded in the uploading process, and the security library application process may include generating the security-applied binary by replacing the debugging library extracted in the execution package decomposition process with one of the plurality of security libraries.

The hash code generation process may generates a hash code with respect to a specific function on which a security tag is set in the binary extracted in the execution package decomposition process.

The method may further include an encoding process in which the cloud device encodes the security-applied binary generated in the security library application process by using an encoding key provided corresponding to one of the plurality of security libraries after the hash code generation process.

In accordance with another aspect of the present invention, a method for providing a cloud-based application security service in a security service providing system comprising a client device and a cloud device according to another exemplary embodiment of the present invention includes: a binary generation process in which the client device generates a binary by compiling an application source; a security library providing process in which the cloud device provides one of a plurality of security libraries to the client device; and a security library application process in which the client device generates a security-applied binary by applying the security library provided in the security library providing process to the binary generated in the binary generation process.

In accordance with another aspect of the present invention, there is provided a system for providing a cloud-based application security service comprising a client device and a cloud device according to an exemplary embodiment of the present invention, wherein the client device includes: a compiler configured to generate a binary by compiling an application source; an execution package composition unit configured to compose an execution package comprising the binary generated by the compiler; an uploader configured to upload the execution package composed by the execution package composition unit into the cloud device; and a downloader configured to download a security-applied execution package, to which security is applied, from the cloud device, and the cloud device includes: an execution package decomposition unit configured to extract the binary by decomposing the execution package uploaded by the uploader; a security library providing unit configured to provide one of a plurality of security libraries; a security library application unit configured to generate a security-applied binary by applying the security library provided from the security library providing unit to the binary extracted by the execution package decomposition unit; and an execution package recomposition unit configured to recompose an execution package comprising the security-applied binary generated by the security library application unit.

In accordance with another aspect of the present invention, there is provided a system for providing a cloud-based application security service comprising a client device and a cloud device according to another exemplary embodiment of the present invention, wherein the cloud device includes a security library providing unit configured to provide one of a plurality of security libraries to the client device, and the client device includes: a compiler configured to generate a binary by compiling an application source; and a security library application unit configured to generate a security-applied binary by applying the security library provided from the cloud device to the binary generated by the compiler.

As described above, according to the present exemplary embodiment, it is possible to, based on a cloud, provide convenience in security application and to take rapid action against hacker attacks.

Further, in running a computer program that has sensitive program running and needs security against binary manipulation, a security tag is applied to an important function that needs protection for integrity verification using a memory hash, and only the security tag-applied function is subjected to a binary manipulation inspection using the memory hash when the security tag-applied function is imported, thereby preventing a deterioration in the performance of running computer program and system caused by the burden of hash calculation.

Meanwhile, a security tag is suitable for important functions that need protecting in connection with account authentication, password input, payment, security (hash checking, anti-debugging, or the like), encoding/decoding, authentication certificate verification, product purchase and sale, initialization, server communication, setting file (safe file) reading and writing, judgment of operation result, and program execution, rather than functions iteratively imported at short intervals. These functions generally have a feature of not being iteratively imported by a regular period. Further, even when a function is iteratively imported, the function may be exempted from integrity verification within a certain period of time if the function has been imported again after an integrity verification of the function.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF THE EXEMPLARY EMBODIMENTS

Hereinafter, the present exemplary embodiment will be described in detail with reference to the accompanying drawings.

A method for providing a cloud-based application security service according to the present embodiment may be applied to any program language that is capable of generating a native code, such as C/C++. The method may be implemented in hardware including a personal computer (PC), a server, and a smartphone, or in any operating system on which application software is running, such as Windows, UNIX, Linux, and OS X.

Figure 1:
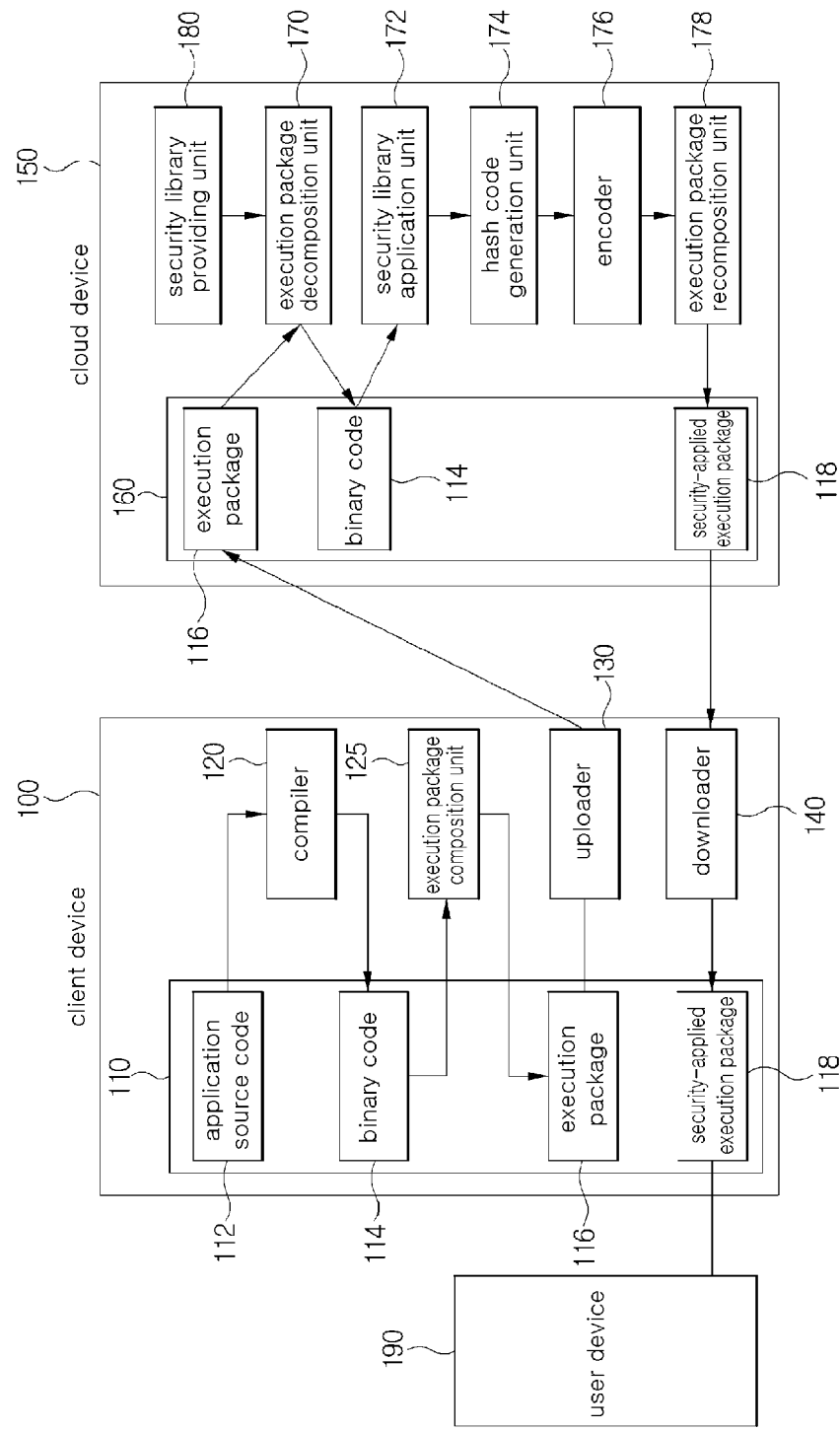
FIG. 1 is a block diagram schematically illustrating a cloud-based application security service system according to an exemplary embodiment of the present invention.

FIG. 1 is a block diagram schematically illustrating a cloud-based application security service system according to an exemplary embodiment of the present invention.

As illustrated in FIG. 1, the application security service system includes a client device 100, a cloud device 150, and a user device 190.

The client device 100 includes a client memory 110, a compiler 120, an execution package composition unit 125, an uploader 130, and a downloader 140.

The client memory 110 stores an application source code 112 of a completely developed application program. The compiler 120 complies the application source code 112 stored in the client memory 110 to generate a binary code 114, and the client memory 110 stores the generated binary code 114. The execution package composition unit 125 combines the binary code 114 stored in the client memory 110 and other resources to compose an execution package 116, and the client memory 110 stores the composed execution package 116.

The uploader 130 uploads the execution package 116 stored in the client memory 110 to the cloud device 150, the downloader 140 downloads a security-applied execution package 118 from the cloud device 150, and the client memory 110 stores the downloaded security-applied execution package 118.

The cloud device 150 includes a cloud memory 160, an execution package decomposition unit 170, a security library application unit 172, a hash code generation unit 174, an encoder 176, an execution package recomposition unit 178, and a security library providing unit 180.

The cloud memory 160 stores the execution package 116 uploaded from the uploader 130. The execution package decomposition unit 170 decomposes the execution package to extract the binary code 114, and the cloud memory 160 stores the binary code 114. The security library application unit 172 applies a security library, which is provided from the security library providing unit 180, to the binary code 114.

The hash code generation unit 174 generates a hash code by using a hash function on the security-applied binary code. Here, the hash code generation unit 174 may generate a hash code per file or memory. The encoder 176 performs encoding by using an encoding algorithm on the security-applied binary code and the hash code, which is generated by the hash code generation unit 174. The execution package recomposition unit 178 combines the security-applied binary code and other resources to recompose them into the security-applied execution package 118.

The security library providing unit 180 provides a security library to the security library application unit 172 and stores a plurality of security libraries. The plurality of security libraries includes different forms of security libraries, since each is generated by using code obfuscation. The security libraries generally include a hash verification function and may include an anti-debugging function, which prevents a program from being analyzed statically or dynamically by a tool such as a debugger or prevents a program from being attached by an inserted malicious code, and may include an anti-dump function, which prevents a memory state of a running process from dumping.

The user device 190 downloads the security-applied execution package 118 stored in the client memory 110 to run an application.

Figure 2:
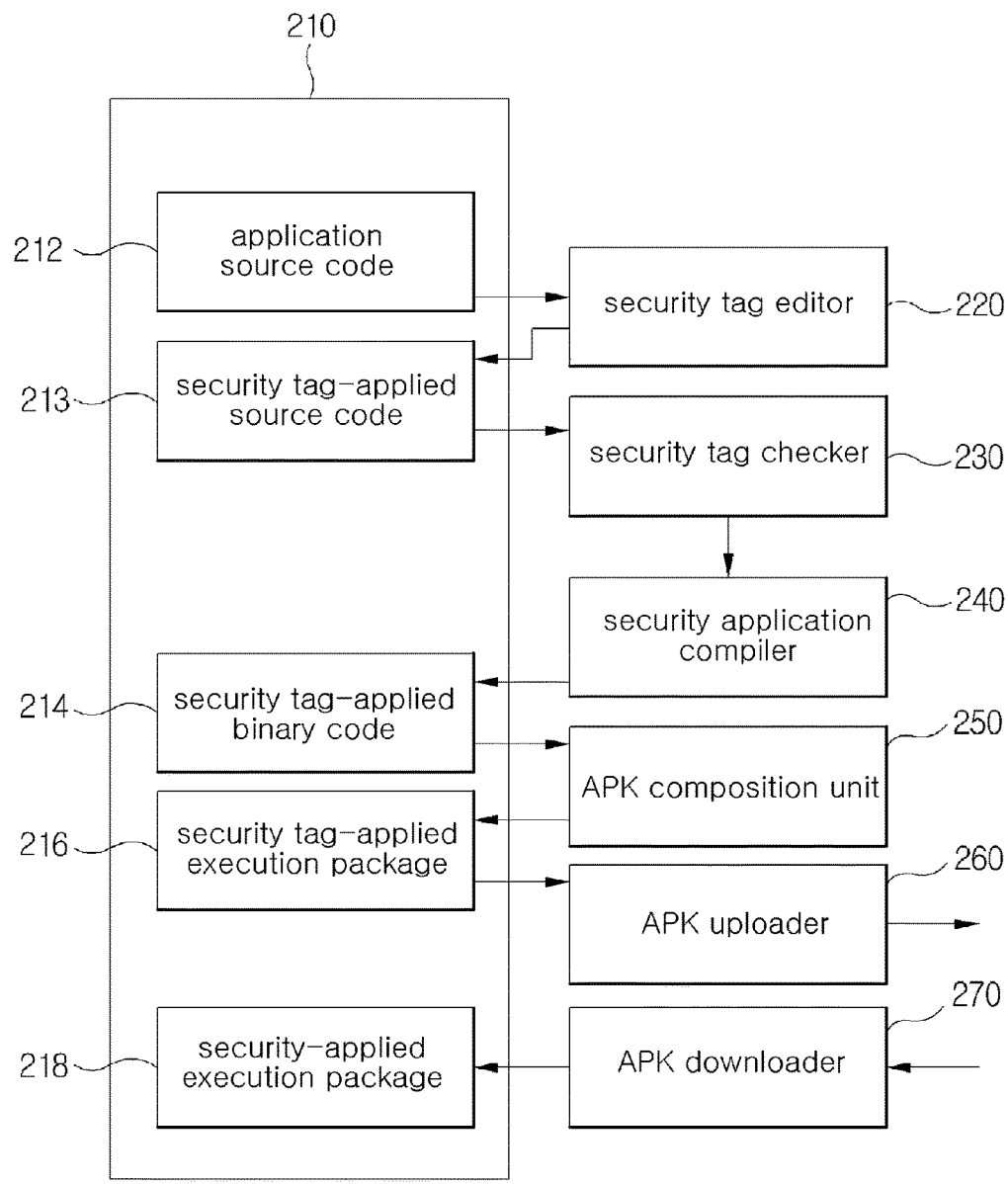
FIG. 2 is a detailed block diagram illustrating the client device of FIG. 1.

FIG. 2 is a detailed block diagram illustrating the client device of FIG. 1.

As illustrated in FIG. 2, the client device 100 includes a client memory 210, a security tag editor 220, a security tag checker 230, a security application compiler 240, an Android PacKage (APK) composition unit 250, an APK uploader 260, and an APK downloader 270.

The client memory 210 stores an application source code 212 of a completely developed application program.

The security tag editor 220 is provided to edit a security tag for a security-necessary specific function in the application source code 212. The security tag may include a start tag indicating a start point of integrity verification and an end tag indicating an end point thereof. The security tag-applied source code 213 edited by the security tag editor 220 is stored in the client memory 210.

Meanwhile, the security tag editor 220 may add a debugging library regarding the security tag. The debugging library is replaced with a release security library in the security library application unit 172 of the cloud device 150. Generally, when a Soft Development Kit (SDK) is applied, an anti-debugging function often makes debugging difficult even in development. In the present embodiment, however, the debugging library is added to eliminate an inconvenience caused by debugging in development.

The security tag checker 230 checks the security tag in the security tag-applied source code 213, and automatically connects the security tag to the debugging library if the security tag is discovered.

The security application compiler 240 compiles the source code including at least one or more of the functions to which the security tag checked by the security tag checker 230 is applied, to generate a security tag-applied binary code 214, and the client memory 210 stores the generated security tag-applied binary code 214.

The APK composition unit 250 combines the security tag-applied binary code stored in the client memory 210 with other resources to compose a security tag-applied execution package 216, and the client memory 210 stores the composed security tag-applied execution package 216.

The APK uploader 260 uploads the security tag-applied execution package 216 stored in the client memory 210 to the cloud device 150, the APK downloader 270 downloads a security-applied execution package 218 from the cloud device 150, and the client memory 210 stores the downloaded security-applied execution package 218.

Figure 3:
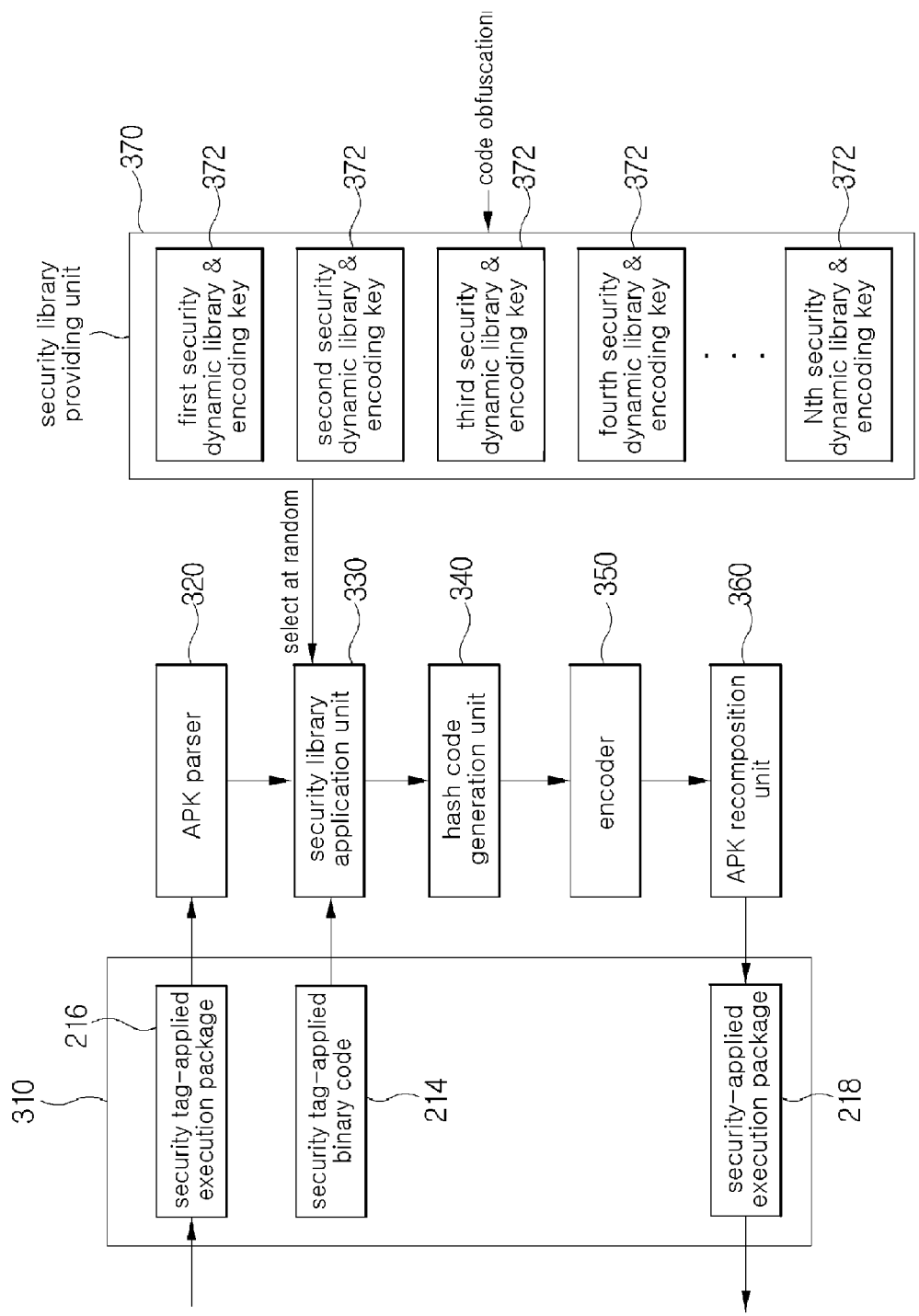
FIG. 3 is a detailed block diagram illustrating the cloud device of FIG. 1.

FIG. 3 is a detailed block diagram illustrating the cloud device of FIG. 1.

As illustrated in FIG. 3, the cloud device 150 includes a cloud memory 310, an APK parser 320, a security library application unit 330, a hash code generation unit 340, an encoder 350, an APK recomposition unit 360, and a security library providing unit 370.

The cloud memory 310 stores the security tag-applied execution package 216 uploaded by the APK uploader 260. The APK parser 320 parses the security tag-applied execution package 216 of an APK file to extract the debugging library.

The security library application unit 330 replaces the parsed debugging library with a release security library provided from the security library providing unit 370. Further, the security library application unit 330 may be provided with an encoding key in addition to the release security library.

The hash code generation unit 340 may generate a hash code by using a security tag-applied specific function of a release security-applied binary code as an input of a hash function (MD5, SHA, Checksum, or the like). According to an embodiment, the hash code generation unit 340 may also generate a hash code per file by using an essential file that is necessary to run a program and an application file as an input of a hash function (MD5, SHA, Checksum, or the like) and may generate a hash registry including the generated hash code per file. An essential file that is necessary to run a program in a unity-based application may be, for example, libmono.so, libunity.so MonoSecurity.dll, UnityEngine.dll, and the like.

The encoder 350 encodes the security tag-applied specific function of the release security-applied binary code by using an encoding key provided from the security library providing unit 370 according to an encoding algorithm, such as DES, AES, RSA, or the like. In this case, according to an embodiment, the encoder 350 may also encode a dynamic library. Further, the encoder 350 may encode the hash code generated by the hash code generation unit 340.

The APK recomposition unit 360 combines the encoded release security-applied binary code and other resources to recompose them into an execution package.

The security library providing unit 370 may store a plurality of security libraries and encoding keys 372. The plurality of security libraries and encoding keys includes security libraries with different values, since each is generated by using code obfuscation. The security library providing unit 370 provides the security library application unit 330 with a security dynamic library and an encoding key that are selected at random among the plurality of security libraries and encoding keys. The security library providing unit 370 deletes a security library and an encoding key, which have already been used, to prevent them from being reused.

Although FIG. 3 shows that one cloud device 150 includes all of the cloud memory 310, the APK parser 320, the security library application unit 330, the hash code generation unit 340, the encoder 350, the APK recomposition unit 360, and the security library providing unit 370, which does not refer to one physically integrated configuration, the security library providing unit 370 may be provided from another device.

Figure 4:
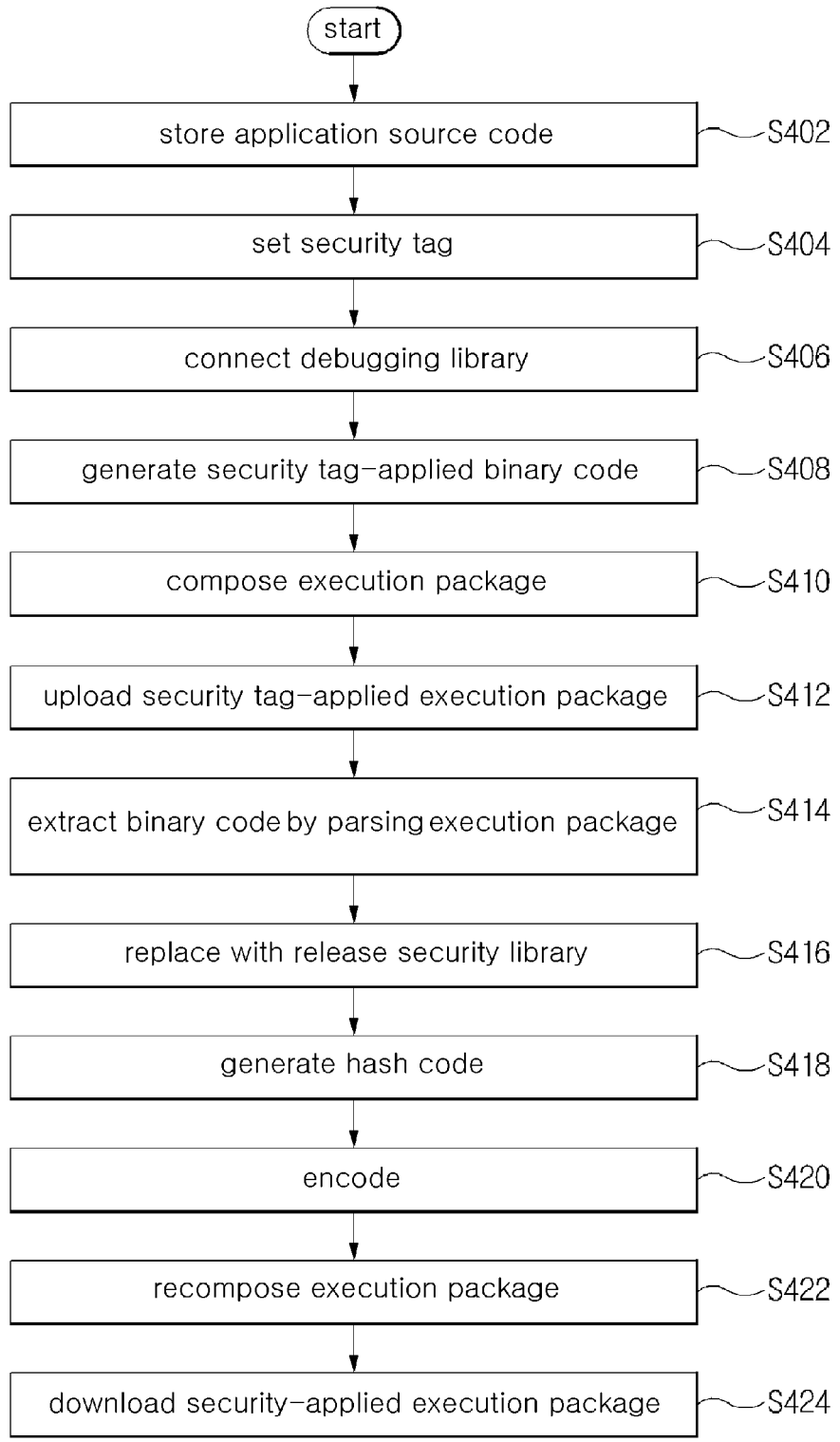
FIG. 4 is a flowchart illustrating a method for providing an application security service according to an exemplary embodiment of the present invention.

FIG. 4 is a flowchart illustrating a method for providing an application security service according to an exemplary embodiment of the present invention.

When an application developer has developed an application program, the client memory 210 stores an application source code 212 of the developed application program (S402).

The application developer sets a security tag for a security-necessary specific function in the application source code 212 by using the security tag editor 220 (S404). For example, in the source code of a computer program including a plurality of functions, the application developer may set a security tag on at least one or more functions of important functions that need a protect in connection with account authentication, password input, payment, security (hash checking, anti-debugging, or the like), encoding, decoding, authentication certificate verification, product purchase and sale, initialization, server communication, setting file (safe file) reading and writing, judgment of operation result, and program execution. These functions generally have a feature of not being iteratively imported by periods but receive significant attention from those who intend to manipulate the computer program. Therefore, even though the integrity of only these functions is verified, a high validity may be achieved and the deterioration in the performance of a running program caused by integrity verification may be minimized.

The security tag checker 230 checks the security tag in the security tag-applied source code 213, and automatically connects the security tag to the debugging library if the security tag is discovered (S406).

The security application compiler 240 compiles the source code including at least one or more of the functions to which the security tag stored in the client memory 210 is applied, to generate a security tag-applied binary code 214 (S408), and the client memory 210 stores the generated security tag-applied binary code 214.

The APK composition unit 250 combines the security tag-applied binary code 214 stored in the client memory 210 with other resources to compose a security tag-applied execution package 216 (S410), and the client memory 210 stores the composed security tag-applied execution package 216.

The APK uploader 260 uploads the security tag-applied execution package 216 stored in the client memory 210 to the cloud device 150 (S412).

The cloud memory 310 stores the security tag-applied execution package 216 uploaded by the APK uploader 260, and the APK parser 320 parses the security tag-applied execution package 216 of an APK file to extract the debugging library (S414).

The security library application unit 330 replaces the parsed debugging library with a release security library provided from the security library providing unit 370 (S416).

The hash code generation unit 340 may generate a hash code by using a security tag-applied specific function of a release security-applied binary code as an input of a hash function (MD5, SHA, Checksum, or the like) (S418). According to an embodiment, the hash code generation unit 340 may also generate a hash code per file by using an essential file that is necessary to run a program and an application file as an input of a hash function (MD5, SHA, Checksum, or the like) and may generate a hash registry including the generated hash code per file. An essential file that is necessary to run a program in a unity-based application may be, for example, libmono.so, libunity.so MonoSecurity.dll, UnityEngine.dll, and the like.

The encoder 350 encodes the security tag-applied specific function of the release security-applied binary code by using an encoding key provided from the security library providing unit 370 according to an encoding algorithm, such as DES, AES, RSA, or the like (S420), and according to an embodiment, the encoder 350 may also encode a dynamic library.

The APK recomposition unit 360 combines the encoded release security-applied binary code and other resources to recompose them into a security-applied execution package 218 (S422).

The APK downloader 270 downloads the security-applied execution package 218 from the cloud device 150 (S424), and the client memory 210 stores the downloaded security-applied execution package 218.

Figure 5:
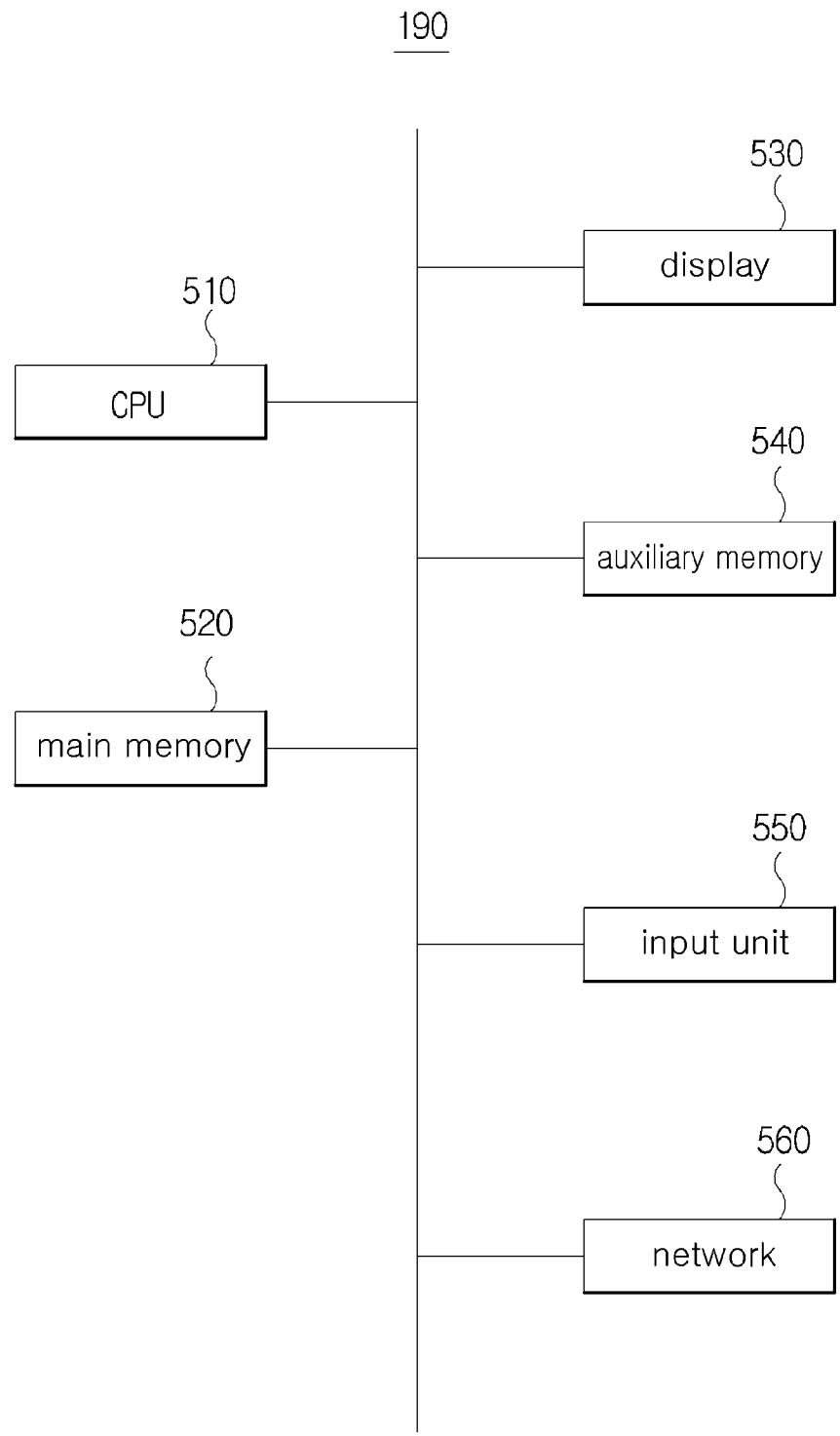
FIG. 5 is a detailed block diagram illustrating the user device of FIG. 1.

FIG. 5 is a detailed block diagram illustrating the user device of FIG. 1.

The security-applied execution package 218 stored in the client memory 210 is stored in an auxiliary memory 540 of the user device 190 through a network 560 or a distribution channel such as a storage medium. The execution package is loaded into a main memory 520 and is executed by a CPU 510, for example, upon running a game program. An execution result of the game program is displayed on a display 530. The game program may receive a new input value through an input unit 550 or the network 560.

The user device 190 according to the exemplary embodiment of the present invention may be a user terminal, for example, a personal computer (PC), a notebook computer, a tablet PC, a Personal Digital Assistant (PDA), a game console, a Portable Multimedia Player (PMP), a PlayStation Portable (PSP), a wireless communication terminal, a smartphone, a TV, and a media player. The user device 190 according to the exemplary embodiment of the present invention may be the terminal of a server, such as an application server or a service server. The user device 190 according to the exemplary embodiment of the present invention may refer to various devices including: (i) a communication device, such as a communication modem to perform communications with different types of devices or wired/wireless communication networks; (ii) a memory that stores data for running a program; and (iii) a microprocessor that runs a program to perform calculations and control. According to at least one exemplary embodiment, the memory may be a computer-readable recording/storage medium, such as a Random Access Memory (RAM), a Read Only Memory (ROM), a flash memory, an optical disk, a magnetic disk, and a Solid State Disk (SSD). According to at least one exemplary embodiment, the microprocessor may be programmed to selectively perform one or more of the operations and functions described in the specification.

Figure 6:
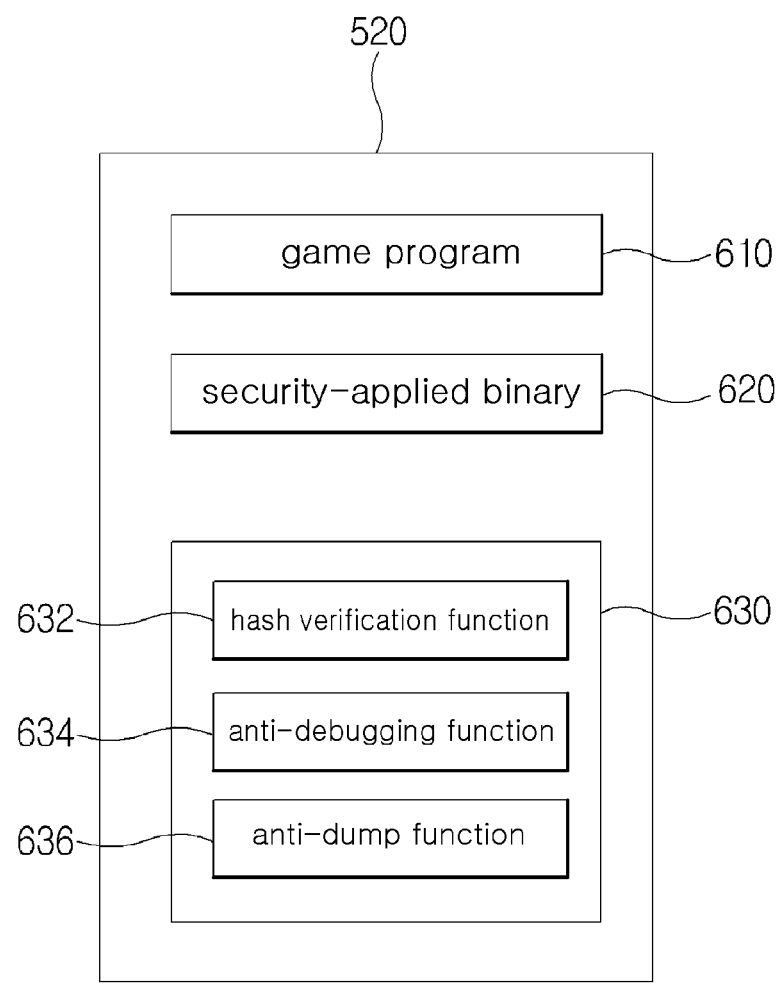
FIG. 6 illustrates a configuration relating to an application program loaded into a main memory illustrated in FIG. 5.

FIG. 6 illustrates a configuration relating to an application program loaded into the main memory illustrated in FIG. 5.

FIG. 6 illustrates a game program 610, a security-applied binary 620, and a security library 630 which are loaded into the main memory 520 to be run. The security library 630 includes a security function, such as a hash verification function 632, an anti-debugging function 634, and an anti-dump function 638. When the game program is run, a binary of the game program is loaded from the auxiliary memory 540 into the main memory 520. When a specific function on which a security tag is set is imported from the security-applied binary 620 during the running of the game program, the verification function 632, the anti-debugging function 634, and the anti-dump function 638 of the security library 630 are implemented.

Figure 7:
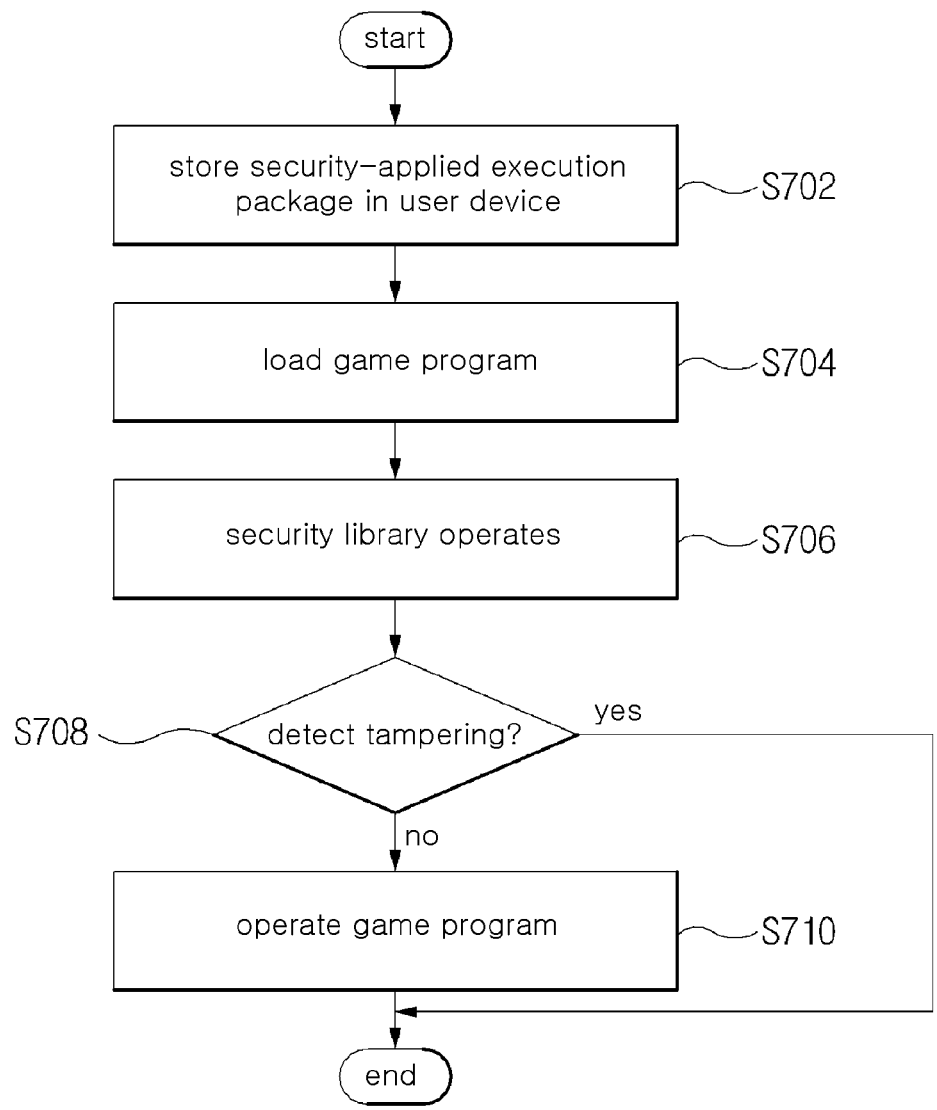
FIG. 7 illustrates a process in which an application imports a module included in a dynamic library according to an exemplary embodiment of the present invention.

FIG. 7 illustrates a process in which an application imports a module included in a dynamic library according to an exemplary embodiment of the present invention.

The security-applied execution package 218 stored in the client memory 210 is stored in the auxiliary memory 540 of the user device 190 through the network 560 or a distribution channel such as a storage medium (S702).

When a game program is run, the CPU 510 loads the game program 610 of the security-applied execution package 218 into the main memory 520 (S704). As the game program 610 is run, the security library 630 is loaded to operate (S706).

When the security library 630 operates to detect tampering (S708), the game program is ended. When no tampering is detected, the security library 630 operates the game program (S710).

The above embodiments have been described merely for the purpose of illustrating the technical idea of the present invention, and those skilled in the art will appreciate that various modifications and changes are possible without departing from the scope and spirit of the present invention. Therefore, the embodiments of the present invention are not intended to limit, but to illustrate the technical idea of the present invention, and the scope of the technical idea of the present invention is not limited by the embodiments. The scope of the present invention shall be construed on the basis of the accompanying claims in such a manner that all of the technical ideas included within the scope equivalent to the claims belong to the present invention.

What is claimed is:

1. A method for providing a cloud-based application security service in a security service providing system comprising a client device and a cloud device, the method comprising:
a binary generation process in which the client device generates a binary by compiling an application source;
an execution package composition process in which the client device composes an execution package comprising the binary generated in the binary generation process;
an uploading process in which the client device uploads the execution package composed in the execution package composition process into the cloud device;
an execution package decomposition process in which the cloud device extracts a binary by decomposing the execution package uploaded in the uploading process;
a security library application recomposition process in which the cloud device generates a security-applied binary by applying one of a plurality of security libraries to the binary extracted in the execution package decomposition process;
an execution package recomposition process in which the cloud device recomposes a security-applied execution package comprising the security-applied binary generated in the security library application process; and
a downloading process in which the client device downloads the security-applied execution package recomposed in the package recomposition process.

2. The method of claim 1, wherein the security library comprises a hash verification function for integrity verification, and the method further comprises a hash code generation process in which the cloud device generates a hash code with respect to the binary extracted in the execution package decomposition process for the hash verification function in the security library.

3. The method of claim 2, wherein the security library comprises an anti-debugging function, an anti-dump function, or an anti-debugging function and dump function in addition to the hash verification function.

4. The method of claim 2, further comprising a security tag setting process in which the client device sets a security tag for a specific function of the application source before the binary generation process.

5. The method of claim 4, further comprising a debugging library connection process in which the client device automatically connects a relevant debugging library to the security tag when the security tag set in the security tag setting process is detected.

6. The method of claim 5, wherein the execution package decomposition process comprises extracting the debugging library by parsing the execution package uploaded in the uploading process, and the security library application process comprises generating the security-applied binary by replacing the debugging library extracted in the execution package decomposition process with one of the plurality of security libraries.

7. The method of claim 6, wherein the hash code generation process generates a hash code with respect to a specific function on which a security tag is set in the binary extracted in the execution package decomposition process.

8. The method of claim 7, further comprising an encoding process in which the cloud device encodes the security-applied binary generated in the security library application process by using an encoding key provided corresponding to one of the plurality of security libraries after the hash code generation process.

9. A method for providing a cloud-based application security service in a security service providing system comprising a client device and a cloud device, the method comprising:
a binary generation process in which the client device generates a binary by compiling an application source;
a security library providing process in which the cloud device provides one of a plurality of security libraries to the client device; and
a security library application process in which the client device generates a security-applied binary by applying the security library provided in the security library providing process to the binary generated in the binary generation process.

* * * * *